Aug. 9, 1927.
A. A. RUTTAN
1,638,552
FILM PACK CONSTRUCTION
Filed Dec. 4, 1925
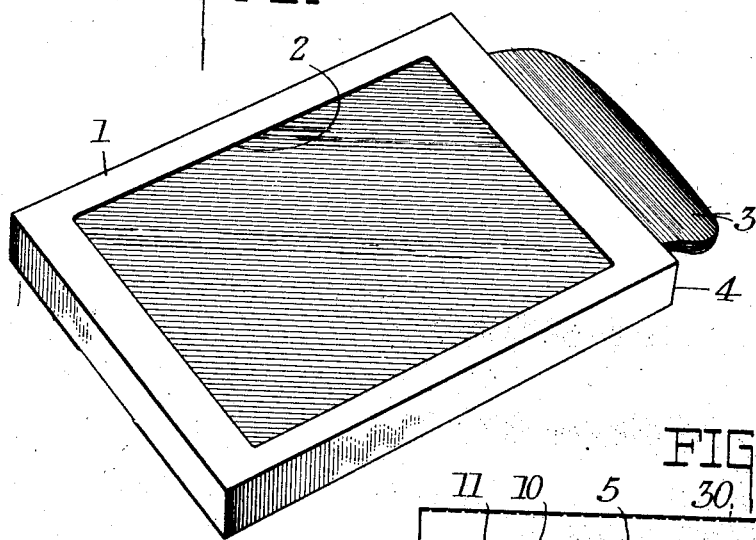
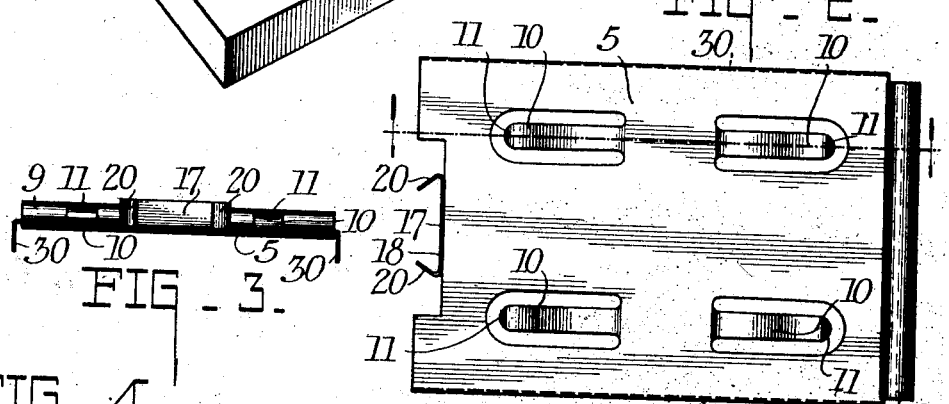
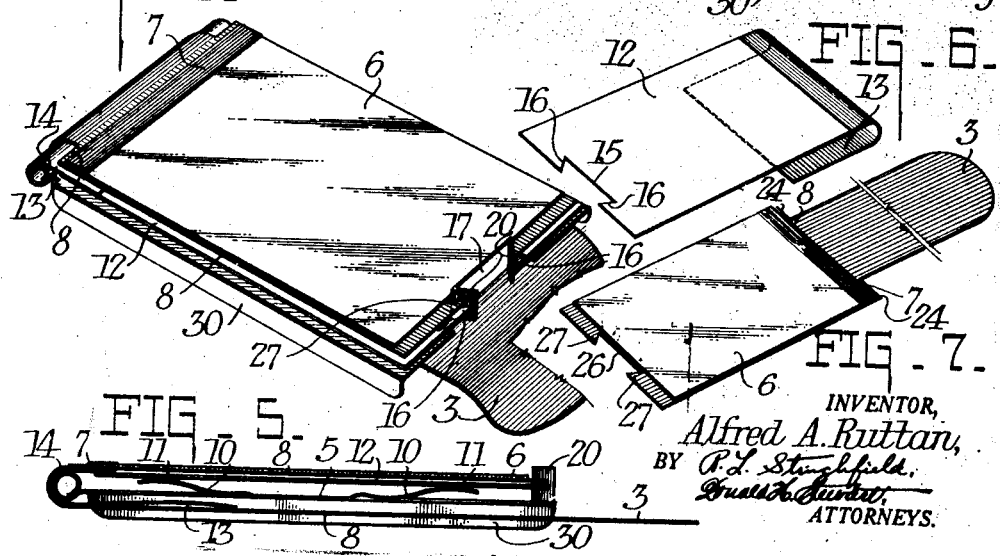
INVENTOR,
Alfred A. Ruttan,
BY
ATTORNEYS.

Patented Aug. 9, 1927.

1,638,552

UNITED STATES PATENT OFFICE.

ALFRED A. RUTTAN, OF ROCHESTER, NEW YORK, ASSIGNOR TO EASTMAN KODAK COMPANY, OF ROCHESTER, NEW YORK, A CORPORATION OF NEW YORK.

FILM-PACK CONSTRUCTION.

Application filed December 4, 1925. Serial No. 73,125.

This invention relates to photography, and more particularly to photographic film packs. One object of my invention is to provide a film pack in which the films may be quickly and accurately placed in assembling. Another object is to provide a frictional film retainer for each individual film backing paper, so as to reduce the possibility of accidentally removing more than one film at a time from the exposure to the storage chamber of the film pack. Another object is to provide a suitable anchor for the follower plate of the film pack. Another object is to provide a guideway on which the successive films may move into exposure position. Another object is to provide a means for accurately registering the films behind the frames. Another object is to provide an anchor member which may be formed as an integral part of the pack, and other objects will appear hereinafter from the following specification, the novel features being pointed out in the claims at the end thereof.

This invention is for an improvement of a film pack using as a part of its construction many of the parts shown in U. S. Patent No. 1,219,588 for photographic film pack, issued Mar. 20, 1917, to myself and Chas. E. Hutchings. Reference can, therefore, be had to this patent for the general structure of my present pack.

Coming now to the drawings, wherein like reference characters denote like parts throughout:

Fig. 1 is a perspective view of an assembled film pack;

Fig. 2 is a plan view of a partition member constructed in accordance with and illustrating my invention;

Fig. 3 is an end elevation of the part shown in Fig. 2;

Fig. 4 is a perspective view of the partition plate with a follower plate and single film with tab assembled thereon;

Fig. 5 is a section on line 5—5 of Fig. 2 with a presser plate and a film added; and Figs. 6 and 7 are perspective views of the follower plate and of a film and tab adapted for use with the partition plate illustrated in the drawings.

The film pack casing may be constructed as illustrated in the above mentioned patent, in having a casing 1 provided with an exposure frame 2 in one side and having film tabs 3 extending from one end 4.

In the center of the casing 1 there is a partition plate 5 dividing the casing into a supply chamber for unexposed films and a storage chamber for exposed films having a latent image. The films 6 may be attached at 7 to protective paper coverings 8 and these may be drawn around the end 9 of plate 5 by the tabs 3 in the customary manner.

Coming now to my invention, the partition plate 5 may be provided with springs 10, having ends 11 adapted to thrust out upon a presser plate 12, which may be of relatively stiff material such as metal or cardboard. The presser 12, as shown in Fig. 6, has a flexible paper end 13 adapted to encircle the end 14 of plate 5 and to thus provide a smooth slideway for the films to be hereinafter described. Presser 12 is also provided with a dove-tail cut-out 15, the end walls 16 of which retain the presser in position on the partition plate 5 by engaging the lug 17. This lug is preferably also of dovetail shape consisting of a flat wall 18 and end walls 20 which are closely fitted by the cut-out 15. The material of which plate 12 is made being stiff, the cut-out 15 will not pull from the lug 17 but is free to ride to and from plate 5 under the influence of springs 10.

Over the presser plate 12 is assembled a stack of films 6 mounted by pasters 7 upon backing papers 8 which have extended tabs 3 by which they may be manipulated. The tabs are narrower than the films terminating in shoulders 24, and the film backing paper 8 is longer than the film and is provided with a dovetail cut-out 26. This material is flexible and the projections 27 may be deformed comparatively easily.

A pack, usually twelve of these films and papers are assembled on plate with the dovetail cut-outs 26 engaging lug 17. This not only positions the pack of films in assembling in the proper place but when pressed toward the exposure frame 2 by the presser plate 12 under the impulse of springs 10 it is necessary to exert a steady pull upon a tab 3 to deform the paper walls 27 to free them from the lug 17. Thus the liability of pulling out more than one tab at a time is reduced to a minimum.

It should be especially noted that the lug 17 resists a pull in the plane of the backing paper but permits each paper to be pressed toward the frame 2 as films are exposed and are drawn into the exposed film chamber. Thus lug 17 forms not only a frictional film retaining member but a track upon which the films may move toward the exposure frame. Such a track insures proper registration of each film with the frame, so that as all edges of the film are sure to contact with frame 2, the films will be prevented from buckling where that buckling formerly occurred due to an edge of the film coming inside of the frame 2.

The operation of my pack from the assembler's standpoint is that a pack of films (as shown in Fig. 7) is laid on a presser plate (shown in Fig. 6) and they are together laid with the dovetail cut-outs 26 and 15 engaging lug 17. The paper tabs 3 are folded over end 14 between rails 30 (Fig. 5) and this assemblage of parts is inserted into the film pack casing. All parts have been accurately and easily registered.

The operation of my pack from the users standpoint is much the same as usual, that is one tab at a time is drawn out as the exposures are made. A firm steady pull is required to dislodge the paper ends 27 from lug 17, thus reducing the chance of accidentally withdrawing more than one tab.

Having thus described my invention, what I claim as new and desire to secure by Letters Patent is:

1. In a photographic film pack, the combination with a casing, of a partition member therein, a flange on the partition member, a film element including a sheet of film and backing paper adapted to cooperate with the flange whereby the film element may be positioned on the partition.

2. In a photographic film pack, the combination with a casing, of a partition member therein, a guideway on the partition, a presser plate, and a spring member between the partition and presser plate tending to separate these parts, a film element consisting of a sheet of films and protective covering adapted to lie on the presser plate and means on the film element for engaging the guideway whereby the film may slide on the guideway under the spring pressure.

3. In a photographic film pack, the combination with a casing, of a partition member therein, a guideway on the partition, a presser plate, and a spring member between the partition and presser plate tending to separate these parts, a film element including a film sheet and protective covering adapted to lie on the presser plate, and means on the film element for engaging the guideway whereby the film may slide on the guideway under the spring pressure, said means tending to retain the film against other movement.

4. In a photographic film pack, the combination with a casing, of a partition member therein, a guideway on the partition, a presser plate, and a spring member between the partition and presser plate tending to separate these parts, a film element including a sheet of film and protective covering adapted to lie on the presser plate, and means on the film element for engaging the guideway whereby the film element may slide on the guideway under the spring pressure said means being of deformable material whereby a force exerted on the film protective covering will remove the film element from the flange.

5. In a photographic film pack, the combination with a casing, adapted to hold a plurality of films, of a plurality of films in the casing, a film covering attached to each of the films, a flange mounted inside of the casing, walls of the covering being adapted to engage the flange, and an operating tab adapted to deform the walls engaging the flange when a force is exerted on the tab to move a film.

6. In a photographic film pack, the combination with a casing adapted to hold a plurality of films, of operable means for moving the films inside of the casing from the exterior thereof, and means for frictionally holding the films in the casing against movement, said films being movable by force applied to the operable means.

7. In a photographic film pack, the combination with a casing adapted to hold a plurality of films, operable means exteriorly of the casing for moving the films in the casing and cooperating frictionally engaged members in the casing tending to retain the films in the casing, the frictionally engaged members being adapted to be disengaged by the operable means on the outside of the casing.

8. In a photographic film pack, the combination with a casing adapted to hold a plurality of films, film carriers extending outside of the casing for moving the films in the casing, said film carriers having cut-outs therein, a projection inside the casing adapted to be engaged by the cut-outs and to frictionally retain the films in one position in the casing, and means included in the film moving means for overcoming the frictional engagement of the cut-outs and the projection, whereby the films may be moved to another position in the casing.

9. In a photographic film pack, the combination with a casing, of a dovetail guideway therein, a plurality of films, of means associated with the film adapted to engage the dovetail guideway, whereby the films may be frictionally retained in one position in the casing.

10. In a photographic film pack, the combination with a casing, of an exposure frame therein, a partition plate in the casing, springs on the partition plate, a presser plate engaging the springs, a guideway carried by the partition plate, a plurality of films, and film backing papers adapted to lie on the presser plate, means for guiding the films upon the guideway, said guideway being adapted to accurately position a film in front of the exposure frame of the casing.

11. In a photographic film pack, the combination with a casing, having an exposure frame therein, of a guideway inside the casing and adjacent the exposure frame adapted to guide a film to the exposure frame.

12. In a photographic film pack, the combination with a casing having an exposure frame therein, of a guideway inside of the casing at approximately right angles to the exposure frame and positioned along one edge thereof adapted to guide films toward the exposure frame.

13. In a photographic film pack, the combination with a casing having an exposure frame therein, a guideway in the casing, and a film element including a film and a protective covering, a guideway engaging member on the film element including angularly disposed walls adapted to engage the guideway and adapted to be deformed by force to become disengaged from the guideway.

14. A film element for use in a photographic film pack including a protective member, a film sheet, and a fastening means connecting the two together, the film element including a pair of angularly disposed walls adapted to engage parts of a film pack.

15. A film element for use in a photographic film pack including a protective member, a film sheet, and a fastening means connecting the two together, the protecting member being provided with a dovetail cutout portion included between a pair of angularly disposed walls.

16. In a photographic film pack, the combination with a casing, of a plurality of film elements mounted therein, each film element comprising a film, a film backing paper and connections between the film and the film backing paper, means tending to hold the film elements in place including deformable paper members.

Signed at Rochester, New York this 30th day of November, 1925.

ALFRED A. RUTTAN.